United States Patent
Kishore et al.

(10) Patent No.: US 11,567,037 B2
(45) Date of Patent: Jan. 31, 2023

(54) SENSORS, METHODS, AND COMPUTER PROGRAM PRODUCTS FOR FLUID FLOW DETERMINATIONS

(71) Applicant: Honeywell International Inc., Charlotte, NC (US)

(72) Inventors: Kuna Venkat Satya Rama Kishore, Bengaluru (IN); Kaligaselvi Lenin, Bengaluru (IN); Kumaran S. Narasimhan, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 128 days.

(21) Appl. No.: 17/121,005

(22) Filed: Dec. 14, 2020

(65) Prior Publication Data

US 2022/0187248 A1    Jun. 16, 2022

(51) Int. Cl.
G01N 29/032 (2006.01)

(52) U.S. Cl.
CPC . G01N 29/032 (2013.01); *G01N 2291/02433* (2013.01); *G01N 2291/102* (2013.01)

(58) Field of Classification Search
CPC ....... G01N 29/032; G01N 2291/02433; G01N 2291/102
See application file for complete search history.

(56) References Cited

U.S. PATENT DOCUMENTS

| 8,539,812 | B2 | 9/2013 | Stringham et al. |
| 8,770,010 | B1 | 7/2014 | Shapiro |
| 2012/0222471 | A1 | 9/2012 | Raykhman et al. |
| 2018/0120269 | A1 | 5/2018 | Sinha et al. |
| 2019/0128788 | A1 | 5/2019 | Gerardi et al. |
| 2020/0232948 | A1* | 7/2020 | Boe ........................ G01N 29/024 |
| 2021/0030465 | A1* | 2/2021 | Algawi ............ A61B 17/00234 |

FOREIGN PATENT DOCUMENTS

| EP | 3714924 A1 | 9/2020 |
| WO | 2016/138380 A1 | 9/2016 |
| WO | 2017/214403 A1 | 12/2017 |

OTHER PUBLICATIONS

Extended European search report dated Apr. 29, 2022 for EP Application No. 21212251, 9 pages.
Podio, A. L., et al., "Mud gas, solids measured acoustically", Oil Gas Journal, Mar. 21, 1983, vol. 81, No. 12, pp. 155-160, Houston, Texas.

* cited by examiner

*Primary Examiner* — Randy W Gibson
*Assistant Examiner* — John M Royston
(74) *Attorney, Agent, or Firm* — Alston & Bird LLP

(57) ABSTRACT

Sensors, methods, and computer program products for air bubble detection and fluid composition determinations are provided. An example sensor device for use with fluid flow systems includes a force pulse generator coupled with a fluid flow system that emits a force pulse and a force pulse sensor coupled with the fluid flow system. The force pulse sensor receives the force pulse emitted by the force pulse generator and determines the fluid flow system's transient response to the force pulse. Based upon the transient response, the force pulse sensor determines an operating condition of the fluid flow system. The operating condition may be indicative of the presence of an air bubble within the fluid flow system or may be indicative of a composition of a fluid within the fluid flow system. The force pulse sensor may further determine the amplitude and rate of decay of the transient response.

18 Claims, 9 Drawing Sheets

SENSORS, METHODS, AND COMPUTER PROGRAM PRODUCTS FOR FLUID FLOW DETERMINATIONS

TECHNOLOGICAL FIELD

Example embodiments of the present disclosure relate generally to fluid systems and, more particularly, to the determination of operating conditions for fluid flows.

BACKGROUND

Fluid flow systems may be used in a multitude of applications in order to transport or otherwise move fluids from one location to another. For example, intravenous infusion pumps or other pharmaceutical delivery systems may transport drug solutions (e.g., liquid or fluid solutions) to a human patient. In such fluid flow systems, the presence of other materials (e.g., air bubbles, debris, etc.) may be detrimental to operation of the fluid flow system and/or harmful to, for example, a human patient. The inventors have identified numerous deficiencies with these existing technologies in the field, the remedies for which are the subject of the embodiments described herein.

BRIEF SUMMARY

As noted above, fluid flow systems may be used in a variety of contexts or applications in order to transport fluids or liquids. By way of example, industrial applications may transport chemicals, gels, fluids, solutions, etc. that may be prone to having air bubbles located within these fluids or may otherwise generated during operation as part of secondary reactions. These air bubbles may damage industrial equipment (e.g., via cavitation, pitting, etc.) as well as result in errors (e.g., inaccurate chemical compositions, incorrect delivery amounts, etc.) in operation of the equipment. Furthermore, many industrial applications may transport non-homogenous solutions of varying compositions, combinations, mixes, etc. The control of the composition of these solutions may be necessary to ensure the delivery of the proper fluid solution, such as in food processing implementations, fluid storage units, fuel mixing applications, and/or the like. In medical applications, such as intravenous drug infusion pumps or pharmaceutical delivery systems, liquid medication may be provided to a human patient at a particular dosage such that the presence of any other material, debris, or air bubble within these medical applications may result in incorrect dosages and/or, in some instances, damage to the human patient (e.g., induce embolisms or the like).

Conventional attempts at addressing these issues often require separate air bubble detection modules that rely upon ultrasonic sensing technology or other non-invasive techniques that are often prone to false alarms (e.g., inaccurate results). In many instances, ultrasonic signals are transmitted through a fluid and the changes in amplitude of the received ultrasonic signal are used for detection. The frequency of the ultrasonic signal used in these systems, however, may vary widely between applications, fluids, fluid conduit materials, etc. such that a corresponding sensor is required to sweep a large spectrum of ultrasonic frequencies for each detection operation. This requirement results in time-intensive sensing operations and increased processing burdens associated with analyzing ultrasonic signals. Furthermore, ultrasonic sensor systems may be more likely to incur, in the context of air bubble detection, false alarms due to the fluctuation of air proximate the sensor, the decoupling of fluid flow components, and/or the like.

To solve these issues and others, example implementations of embodiments of the present disclosure may provide a sensor configuration that employs a force pulse generator and force pulse sensor configured to emit and detect, respectively, mechanical waves transmitted through a fluid flow. In operation, an example force pulse sensor may receive a force pulse emitted by the force pulse generator and determine the fluid flow system's transient response (e.g., initial amplitude and rate of decay). The transient response may be analyzed to determine an operating condition of the fluid flow system, such as the presence of an air bubble and/or the fluid composition of a non-homogenous solution. In particular, example force pulse sensors may iteratively determine a transient response of the fluid flow system in response to emitted force pulses of the force pulse generator. A difference between these transient responses (e.g., an increased initial amplitude and decreased rate of decay as described hereafter) may be indicative of the presence of an air bubble within the fluid flow system. Additionally, example force pulse sensors may compare the determined transient response of the fluid flow system with calibrated or determined composition thresholds associated with particular fluid compositions (e.g., mixes, density ratios, or the like) to determine a composition of the fluid within the fluid flow. In doing so, such example implementations may reliably detect and confirm the presence of air bubbles and in fluid flow systems as well as the fluid composition of non-homogenous solutions as part of an integrated system component (e.g., without additional detection components).

Sensors, methods, system, devices, and associated computer program products are provided for fluid flow systems. An example sensor device for use with fluid flow systems may include a force pulse generator coupled with a fluid flow system and configured to emit a force pulse and a force pulse sensor coupled with the fluid flow system. The force pulse sensor may be configured to receive the force pulse emitted by the force pulse generator and determine the fluid flow system's transient response to the force pulse. Based upon the transient response of the fluid flow system, the force pulse sensor may determine an operating condition of the fluid flow system based upon the transient response.

In some embodiments, the force pulse sensor may be further configured to generate an alert signal comprising the operating condition.

In some embodiments, the force pulse sensor may be further configured to determine the amplitude and rate of decay of the transient response.

In some embodiments, the force pulse generator may be spaced apart from the force pulse sensor to collectively define a gap configured to receive a fluid flow conduit of the fluid flow system therebetween. In such an embodiment, the operating condition determined by the force pulse sensor may be indicative of a presence of an air bubble within the fluid flow system.

In some further embodiments, the force pulse sensor, in determining the operating condition of the fluid flow system indicative of a presence of an air bubble within the fluid flow system, may be configured to determine a first transient response of the fluid flow system to a first force pulse emitted by the force pulse generator and determine a second transient response of the fluid flow system to a second force pulse emitted by the force pulse generator. In such a further embodiment, the force pulse sensor may further determine a difference between the first transient response and the second transient response, compare the difference with one or more air presence thresholds, and determine the presence of the air bubble within the fluid flow system in an instance in which the difference satisfies the one or more air presence thresholds.

In other embodiments, the force pulse generator may be coupled to an exterior surface of a fluid flow conduit of the fluid flow system, and the force pulse sensor may be coupled to an interior surface of the fluid flow conduit of the fluid flow system. In such an embodiment, the operating condition determined by the force pulse sensor may be indicative of a composition of a fluid within the fluid flow system.

In some further embodiments, the force pulse sensor, in determining the operating condition of the fluid flow system indicative of a composition of a fluid within the fluid flow system, may be configured to compare the fluid flow system's transient response to the force pulse with one or more fluid composition thresholds. In an instance in which the transient response satisfies a fluid composition threshold associated with the defined composition, the force pulse sensor may determine the composition of the fluid within the fluid flow system as a defined composition.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
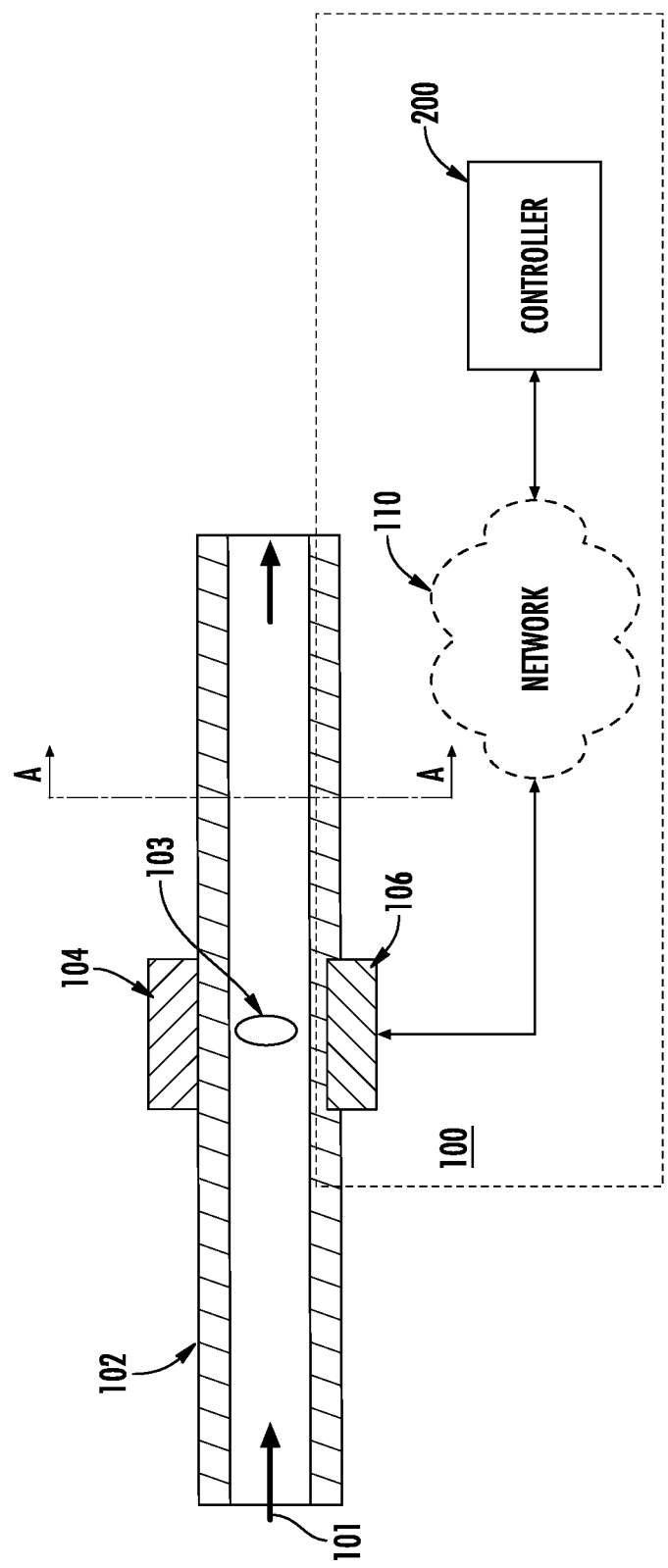
FIG. 1 illustrates an example sensor device and fluid flow system in accordance with some example embodiments described herein.

Some embodiments of the present disclosure will now be described more fully hereinafter with reference to the accompanying drawings, in which some, but not all embodiments of the disclosure are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the description may refer to a controller of an example sensor device (e.g., force pulse sensor) as an example "apparatus." However, elements of the apparatus described herein may be equally applicable to the claimed method and computer program product. Thus, use of any such terms should not be taken to limit the spirit and scope of embodiments of the present invention.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the terms "sensor" and "sensor device" refer to devices and associated computer hardware that is configured (either physically or by the execution of software) to transmit a force pulse through a fluid flow and determine a transient response of an associated fluid flow system based upon the force pulse. By way of example, the sensor device 100 of the present disclosure may include a force pulse generator (e.g., piezoelectric actuator, transducer, or the like) configured to emit a force pulse or equivalent mechanical wave or input through a fluid flow. The sensor device 100 may further include a force pulse sensor (e.g., pressure transducer, sensor, or the like) configured to receive the emitted force pulse and determine a transient response of the fluid flow system. In some embodiments, the sensor or sensor device may include a "smart device" that is equipped with chip of other electronic device that is configured to communicate with a controller, computing device, or the like via Bluetooth, NFC, Wi-Fi, 3G, 4G, 5G protocols, and the like. In some embodiments, the sensor or sensor device may be configured to support or otherwise comprise the controller (e.g., the controller may be formed integral to or as part of the sensor device).

As used herein, the term "controller" refers to any user device, computing device, object, or system which may be in network communication with the force pulse generator and/or the force pulse sensor. For example, the controller may refer to a wireless electronic device configured to perform various transient response related operations in response to a force pulse emitted by the force pulse generator. The controller may be configured to communicate with the force pulse generator, the force pulse sensor, and/or the like via Bluetooth, NFC, Wi-Fi, 3G, 4G, 5G protocols, and the like. In some instances, the controller may comprise the force pulse generator and/or the force pulse sensor.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

With reference to FIG. 1, a fluid flow system 102 is illustrated with a sensor device 100. The fluid flow system 102 may define a fluid conduit (e.g., pipe, duct, or the like) through which fluid may flow. As described above, the fluid flow system 102 may be associated with an industrial application, medical application (e.g., infusion pump, pharmaceutical delivery system, etc.), or the like. As such, the fluid flow system 102 may be configured to support various gels, liquids, solutions, or other fluids as part of operation of such a fluid flow system 102. The fluid flow system 102 may define a fluid flow direction 101 that refers to a direction in which the fluid may flow within the fluid conduit. The fluid within the fluid flow system 102 may flow in a fluid flow direction 101 based upon an output of a pump, positive pressure, and/or the like. Although illustrated and described herein with reference to a fluid flow system 102 that includes a fluid flow direction 101, the present disclosure contemplates that the sensor device 100 described hereafter may be operable with any fluid flow system 102 regardless of configuration. In some instances, an air bubble 103 may be present within the fluid flow system 102 as described hereafter.

Figure 2B:
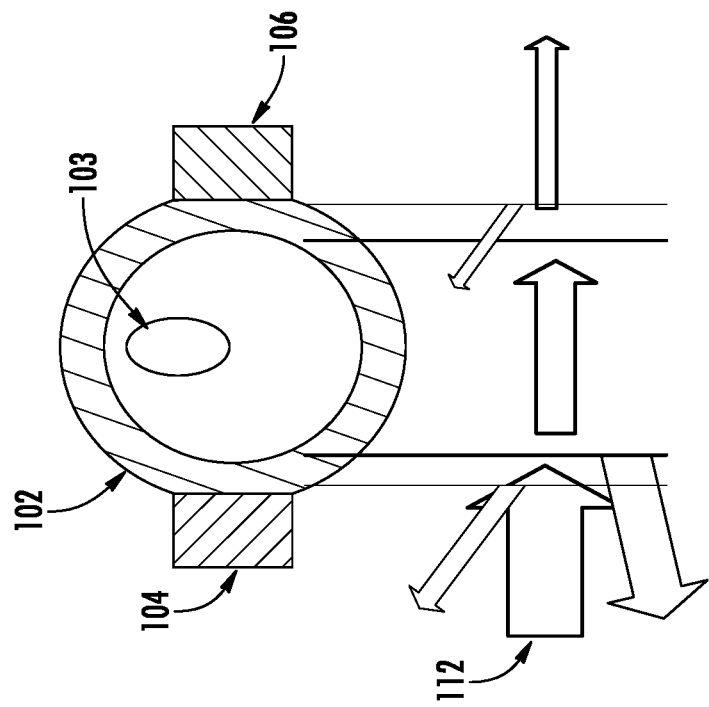
FIG. 2B illustrates a cross-sectional view of the device and system of FIG. 1 along line A-A with an air bubble and example second force pulse, in accordance with some example embodiments described herein.

With reference to FIGS. 1-2B, the sensor device 100 may include a force pulse generator 104 coupled with the fluid flow system 102 and a corresponding force pulse sensor 106 coupled with the fluid flow system 102. As shown, the sensor device 100 may further include a controller 200 operably coupled with the force pulse generator 104 and/or the force pulse sensor 106. Although the controller 200 is illustrated connected via a network 104, the present disclosure contemplates that, in some embodiments, the sensor device 100 may include the controller 200 such that the controller 200 may be in direct connection (e.g., physically connected) with the force pulse generator 104 and/or the force pulse sensor 106. By way of example, the sensor device 100 may define a housing or other enclosure configured to at least partially support one or more of the force pulse generator 104, the force pulse sensor 106, and/or the controller 200 therein. The sensor device 100 may define any housing, attachment mechanism, support structure, or the like, to operably couple the force pulse generator and the force pulse sensor with the fluid flow system The sensor device 100 may include a force pulse generator 104 coupled with the fluid flow system 102 and configured to emit a force pulse. As shown in the embodiment of FIGS. 1-2B, the force pulse generator 104 may be coupled with or otherwise attached to an external surface of a fluid conduit of the fluid flow system 102 and oriented so as to emit a force pulse though the fluid within the fluid flow system 102. For example, the force pulse generator 104 may be oriented so as to emit a force pulse in a lateral direction of the fluid flow system 102 (e.g., substantially perpendicular with respect to the longitudinal flow direction 101 of the fluid flow system). The force pulse generator 104 may include any device, mechanism, or the like for generating a mechanical wave or force. By way of example, the force pulse generator 104 may include a piezoelectric actuator or transducer configured to, in response to an instruction from the controller 200 or otherwise, contract or expand so as to generate force in a direction of travel. Such an actuator or transducer may further block the contraction or expansion, such as by applying a load in the direction of travel, such that the piezoelectric actuator or transducer outputs a blocking force. In some embodiments, the force pulse generator 104 may emit or otherwise output a step force excitation (e.g., of a determined amplitude and duration) based upon the fluid flow system 102 (e.g., diameter of fluid conduit, fluid conduit, etc.). The generated force pulse emitted by the force pulse generator 104 may propagate as a mechanical force wave though the fluid flow system 102 and be received by an associated force pulse sensor 106 described hereafter.

The sensor device 100 may include a force pulse sensor 106 coupled with the fluid flow system 102 and configured to receive the force pulse emitted by the force pulse generator 104. As shown in the embodiment of FIGS. 1-2B, the force pulse sensor 106 may be coupled with or otherwise attached to, in some embodiments, an external surface of a fluid conduit of the fluid flow system 102 and oriented so as to receive the force pulse emitted though the fluid within the fluid flow system. For example, the force pulse sensor 106 may be oriented so as to receive a force pulse in a lateral direction of the fluid flow system 102 (e.g., substantially perpendicular with respect to the longitudinal flow direction 101 of the fluid flow system). The force pulse sensor 106 may include any device, mechanism, or the like for receiving or otherwise detecting a force pulse, mechanical force, and/or mechanical wave. By way of example, the force pulse sensor 106 may include a pressure sensor or transducer configured to receive the emitted force pulse and determine the transient response of the fluid flow system 102 as described hereafter. The present disclosure contemplates that the force pulse sensor 106 may include any type (e.g., diaphragm, piston, bourdon tube, bellows, etc.) of pressure sensor force collectors configured to measure strain or deflection due to a applied force over an area (e.g., a pressure). For example, the force pulse sensor 106 may include one or more of piezoresistive strain gauges, capacitive sensors, electromagnetic sensors, optical sensors, potentiometric sensors, force balancing sensors, or the like.

The force pulse generator 104 and/or the force pulse sensor 106 may, in some embodiments, be coupled with the fluid flow system 102 with a coupling gel or other force transmitting member such that low frequency, pressure-related signals detected as occurring within the fluid conduit are detected by the force pulse sensor 106. Such a gel may also act as a high pass filter allowing force pulses emitted by the force pulse generator 104 to pass through without substantial deflection within the gel. Such a configuration allows for the force pulse generator 104 to emit a force pulse through the fluid conduit and through the gel before reaching the force pulse sensor 106, thereby enabling the sensor device 100's transient response functionality. As illustrated in FIGS. 1-2B, the force pulse generator 104 may be spaced apart from the force pulse sensor 106 to collectively define a gap (e.g., spacing bounded by the generator 104 and the sensor 106) that may receive the fluid flow conduit of the fluid flow system 102 therebetween. Said differently, the embodiments of FIGS. 1-2B may be configured such that the force pulse generation 104 and the force pulse sensor 106 may be secured, via gel or another force transmitting member, to an exterior surface of the fluid conduit of the fluid flow system 102.

Figure 2A:
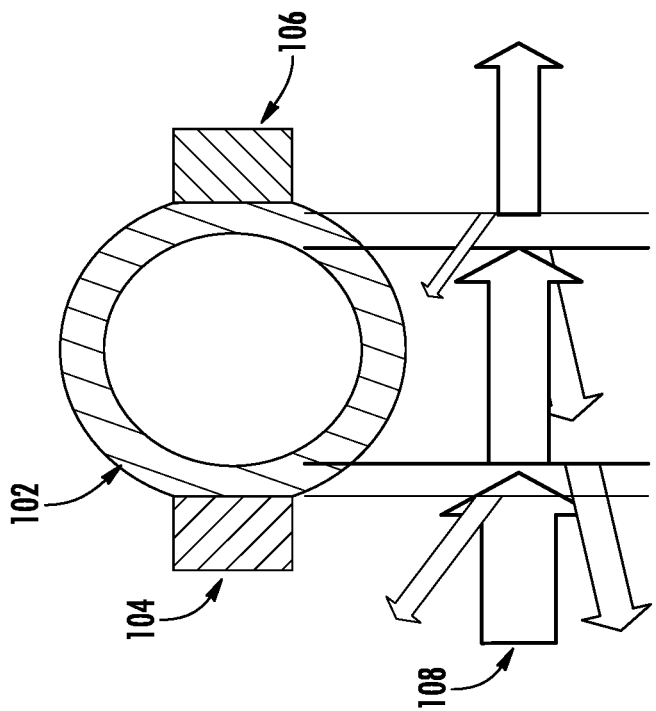
FIG. 2A illustrates a cross-sectional view of the device and system of FIG. 1 along line A-A with an example first force pulse, in accordance with some example embodiments herein.

With reference to FIG. 2A, a first force pulse 108 emitted by the force pulse generator 104 is illustrated in which the fluid flow system 102 does not include an air bubble 103 (e.g., only fluid within the fluid flow conduit). As shown, the first force pulse 108 propagates through the fluid within the fluid flow conduit with minimal reflections of the first force pulse 108 occurring only due to the thickness and/or material of the fluid flow conduit. With reference to FIG. 2B, a second force pulse 112 emitted by the force pulse generator 104 is illustrated in which the fluid flow system 102 includes an air bubble 103 proximate the sensor device 100. As shown, the second force pulse 112 propagates through the fluid but at least a portion of the force pulse is reflected or otherwise dissipated by the air bubble 103 within the fluid conduit such that the force pulse received by the force pulse sensor 106 is reduced as compared to the first force pulse 108, which may be correlated to the detection of the presence of a bubble in the fluid flow system as described hereafter with reference to FIG. 8.

Although described herein with reference to an example first force pulse 108 and an example second force pulse 112, the present disclosure contemplates that the first force pulse 108 may refer to any force pulse emitted by the force pulse generator 104. Said differently, the force pulse generator 104 may iteratively emit force pulses having a determined amplitude and duration regardless of the contents of the fluid flow system 102. As such, the first force pulse 108 may refer to force pulses generated when an air bubble is not present within the fluid flow system 102 proximate the sensor device 100. Similarly, the second force pulse 112 may have, for example, the same amplitude and duration as the first force pulse 108 but may refer to force pulses emitted by the force pulse generator 104 when an air bubble 103 is present within the fluid flow system proximate the sensor device 100.

As described hereafter with reference to the operations of FIGS. 7-9, the force pulse received by the force pulse sensor 106 may be modeled as a mass-spring-damping system represented by the ordinary differential equation (ODE) below in which k represents the spring constant, M represents the mass, and $k_d$ represents the damping coefficient. The mass parameter of the ODE below may refer to the effective mass of the fluid conduit filled with fluid, and the spring constant may refer to the cumulative stiffness of the fluid conduit and fluid. The damping parameter may refer to the systems resistance to displacement. Given that the fluid within the fluid conduit of the fluid flow system 102 is considered incompressible, the fluid may represent the driving factor in the overall stiffness of the system.

$$F(t) = kx(t) + M\frac{d^2x(t)}{dt^2} + k_d \cdot \frac{dx(t)}{dt}$$

For a force pulse emitted by the force pulse generator 104 as a step force excitation, the second order non-homogenous ODE may be modeled by the following equation.

$$x(t) = \frac{1}{\omega n2}\left[1 - \frac{e^{-\beta \omega nt}}{\sqrt{1-\beta 2}}\sin(\omega dt + \varphi)\right]$$

The step force is represented as:

$F(t)=0$ for $t<0$ $\rightarrow =1$ for $t>0+$

The natural frequency of system oscillations is represented as:

$\omega n=\sqrt{k/M}$

The damping ratio of the system is represented as:

$\beta=kd/2\sqrt{M \cdot k}$

The damped natural frequency of the system is represented as:

$\omega d=wn\sqrt{1-\beta 2}$

Phi is represented as:

$$\varphi = \tan^{-1} \frac{\sqrt{1-\beta 2}}{\beta}$$

Figure 3A:
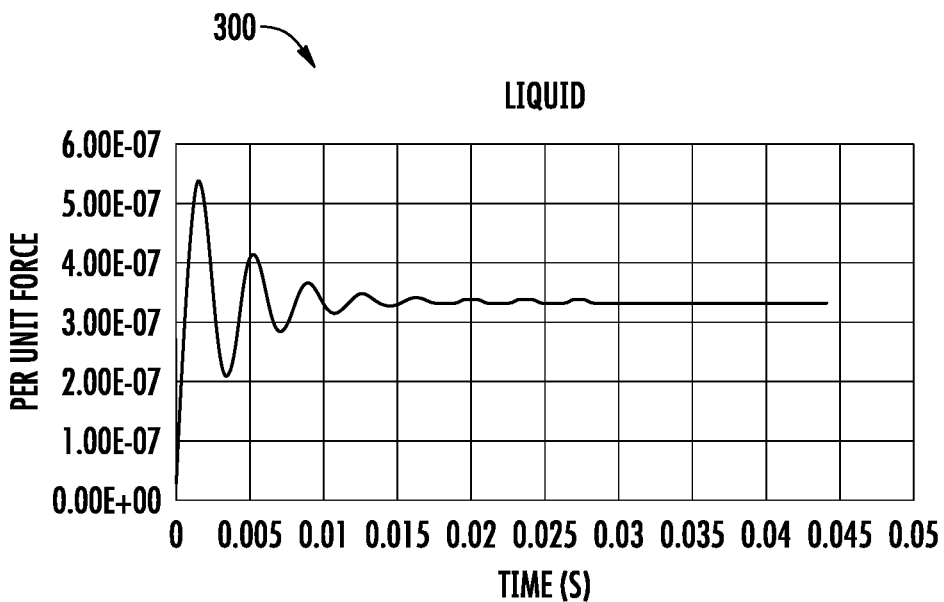
FIG. 3A illustrates an example first transient response of the first force pulse of FIG. 2A, in accordance with some example embodiments described herein.
Figure 3B:
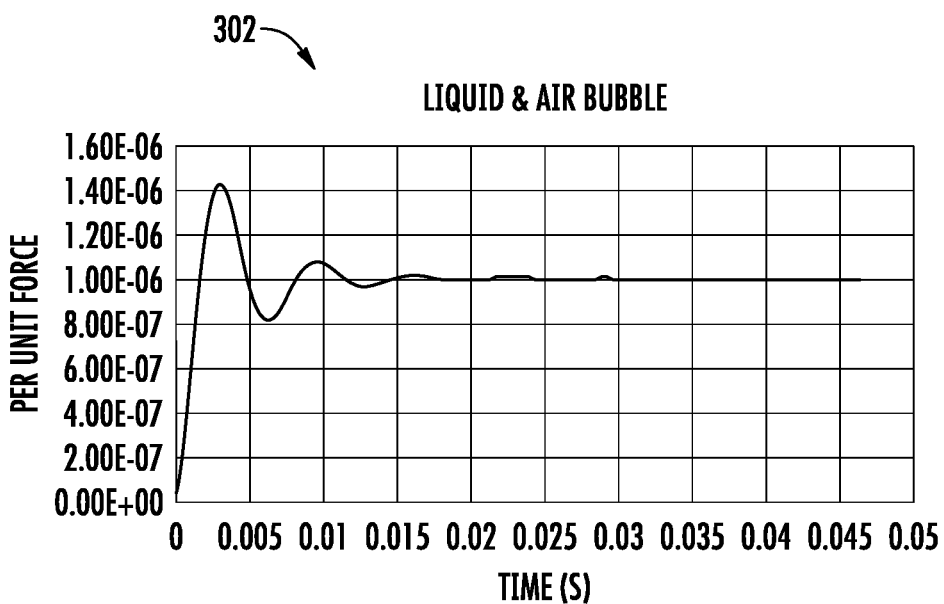
FIG. 3B illustrates an example second transient response of the second force pulse of FIG. 2B, in accordance with some example embodiments described herein.

With reference to FIG. 3A, an example transient response for the fluid flow system 102 in response to the first force pulse 108 of FIG. 2A is illustrated. As described above, FIG. 2A illustrates an instance in which the fluid conduit of the fluid flow system 102 includes only fluid (e.g., an absence of air bubble(s) 103). The incompressible nature of fluid results in an increased spring force, relative the configuration of FIG. 2B, such that the transient response (e.g., the response of the fluid flow system from an equilibrium to a steady state) has an instantaneous motion (e.g., transient response amplitude) that is relatively small and a rate of decay that is relatively longer. With reference to FIG. 3B, an example transient response for the fluid flow system 102 in response to the second force pulse 112 of FIG. 2B is illustrated. As described above, FIG. 2B illustrates an instance in which the fluid conduit of the fluid flow system 102 includes an air bubble 103 proximate the sensor device 100. Unlike fluid, the air within the fluid conduit of the fluid flow system 102 is compressible such that the effective spring constant of the spring-mass-damping model is substantially reduced. Said differently, the cumulative stiffness reduction with an air bubble in the fluid flow conduit may be represented as (K air bubble*K liquid)/(K air bubble+K liquid). Unlike the transient response of FIG. 3A, the transient response of FIG. 3B includes instantaneous motion (e.g., transient response amplitude) that is relatively larger and a rate of decay that is relatively shorter. Said differently, the transient response determined by, for example, the force pulse sensor 106 and/or controller 200 for a fluid conduit housing only fluid includes an amplitude and rate of decay that is different from the transient response for a fluid conduit housing an air bubble 103 such that analysis of the transient response of the fluid flow system 102 may be used as described hereafter to determine operating conditions of the fluid flow system 102.

Figure 4:
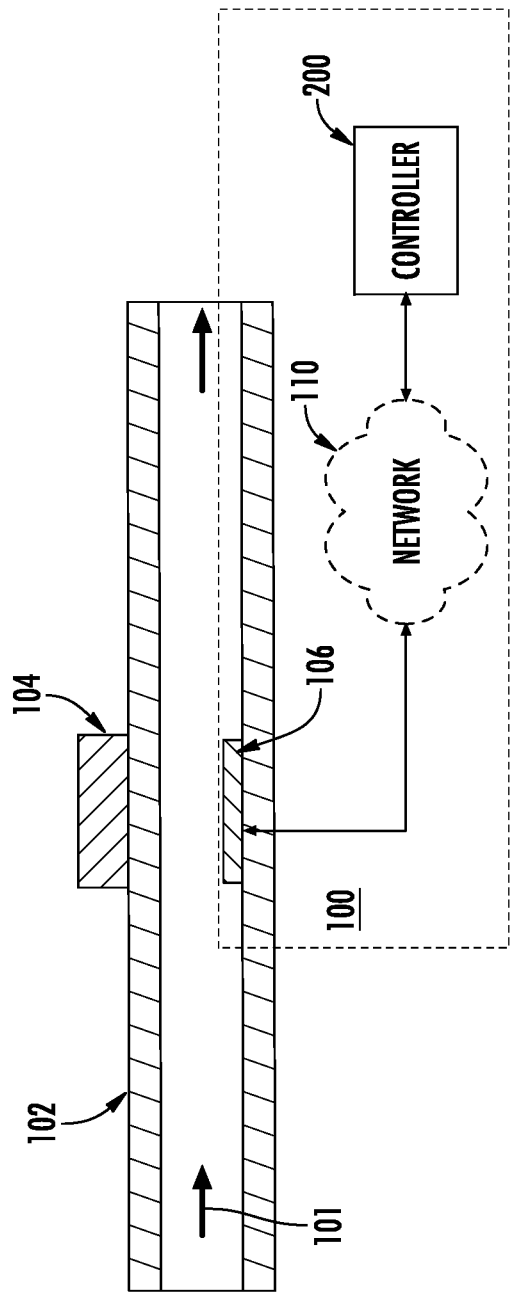
FIG. 4 illustrates another example sensor device and fluid flow system in accordance with some example embodiments described herein.

With reference to FIG. 4, another example sensor device 100 and fluid flow system 102 are shown. Similar to the sensor device 100 of FIG. 1, the fluid flow system 102 may define a fluid conduit to which the sensor device 100 is coupled. In the embodiment of FIG. 4, however, the force pulse sensor 106 may be coupled to an interior surface of the fluid flow conduit of the fluid flow system 102. As shown, in some embodiments, the sensor device 100 may be configured for determining operating conditions of the fluid flow system indicative of a composition of the fluid within the system 102. In the sensor device 100 configuration of FIG. 1, the fluid interface between the force pulse sensor 106 and the fluid within the fluid conduit is removed (e.g., the force pulse sensor 106 is coupled to an exterior surface of the fluid conduit) to prevent any influence of this fluid interface on any transient response determinations due to the potential danger associated with incorrect determinations (e.g., danger associated with failing to detect an air bubble 103). In the determinations regarding fluid composition as described hereafter with reference to FIG. 9, however, the determinations regarding the composition of the fluid within the fluid flow system 102 may, for example, be calibrated as described hereafter to account for any influence by this fluid interface on the transient response determinations of the force pulse sensor 106. As such, in some embodiments, the force pulse sensor 106 may be coupled to an interior surface of the fluid conduit of the fluid flow system 102.

Figure 5:
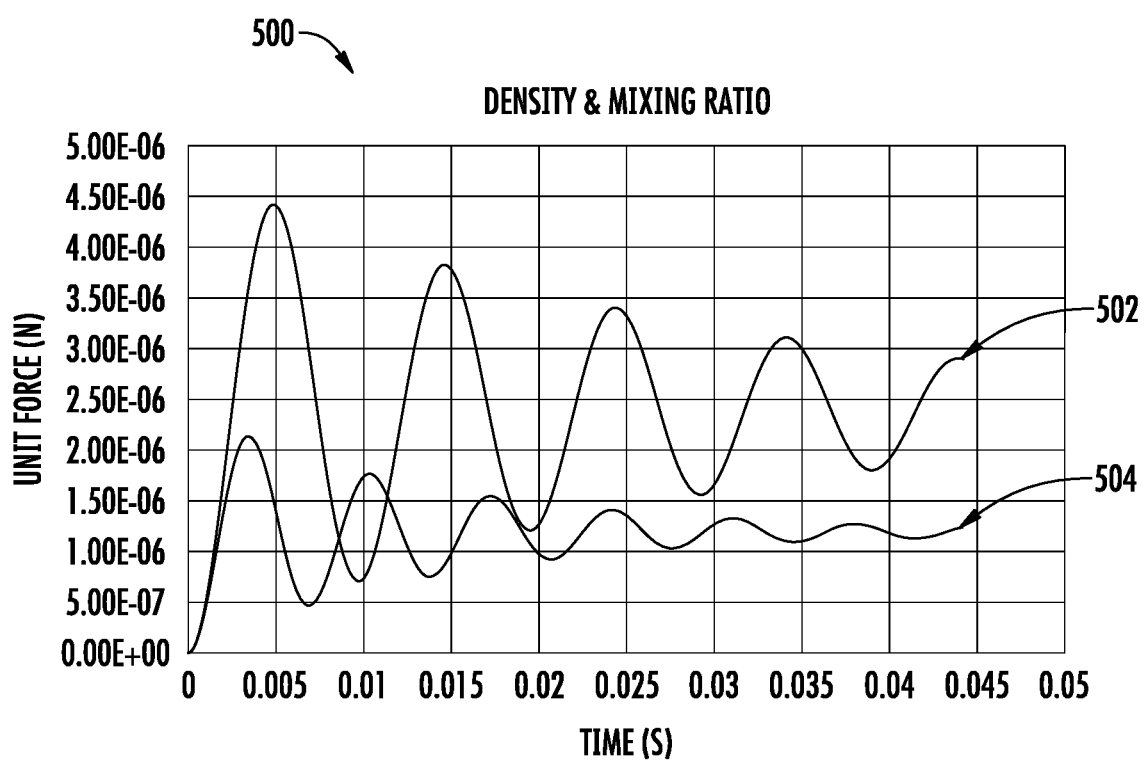
FIG. 5 illustrates an example transient response of the device and system of FIG. 4, in accordance with some example embodiments described herein.

With reference to FIG. 5, an example transient response for the sensor device 100 and fluid flow system 102 of FIG. 4 is illustrated. The transient response of a first fluid 502 and the transient response of a second fluid 504 are shown. For example, the first fluid 502 may be, as described hereafter, denser than the second fluid 504. As described above with reference to the ODE, the mass term of the equation may be influenced by the density (e.g., density=mass/volume) such that a denser fluid (e.g., fluid 502) may have a transient response with a relatively larger amplitude and longer rate of decay. Said differently, the effective spring constant of the ODE may is less dominant than mass change in determining transient response of fluid flow system, but changes in the density of the fluid within the fluid flow system 102 may modify the transient response determined by the force pulse sensor 106 so as to indicate the composition (e.g., mixing ratio or the like) of the fluid within the system 102. Said differently, changes in the effective spring constant may occur, but any such change will be substantially negligible relative the changes in mass for determining the transient response of such an implementation.

Turning back to FIGS. 1 and 4, the controller 200 of the sensor device 100 may include circuitry, networked processors, or the like configured to perform some or all of the apparatus-based (e.g., sensor device-based) processes described herein, and may be any suitable processing device and/or network server. In this regard, the controller 200 may be embodied by any of a variety of devices. For example, the controller 200 may be configured to receive/transmit data (e.g., data associated with the force pulse and/or transient response) and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 6 and described in connection therewith. In some embodiments, the controller 200 may be located remotely from the force pulse generator 104 and/or the force pulse sensor 106, although in other embodiments, the controller 200 may comprise the force pulse generator 104 and/or the force pulse sensor 106 in whole or in part. The controller 200 may, in some embodiments, comprise several servers or computing devices performing interconnected and/or distributed functions. Despite the many arrangements contemplated herein, the controller 200 is shown and described herein as a single computing device to avoid unnecessarily overcomplicating the disclosure. In some embodiments, one or more components of the controller 200 may be wholly or partially housed within one or more of the sensor device 100 and/or the fluid flow system 102.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

Figure 6:
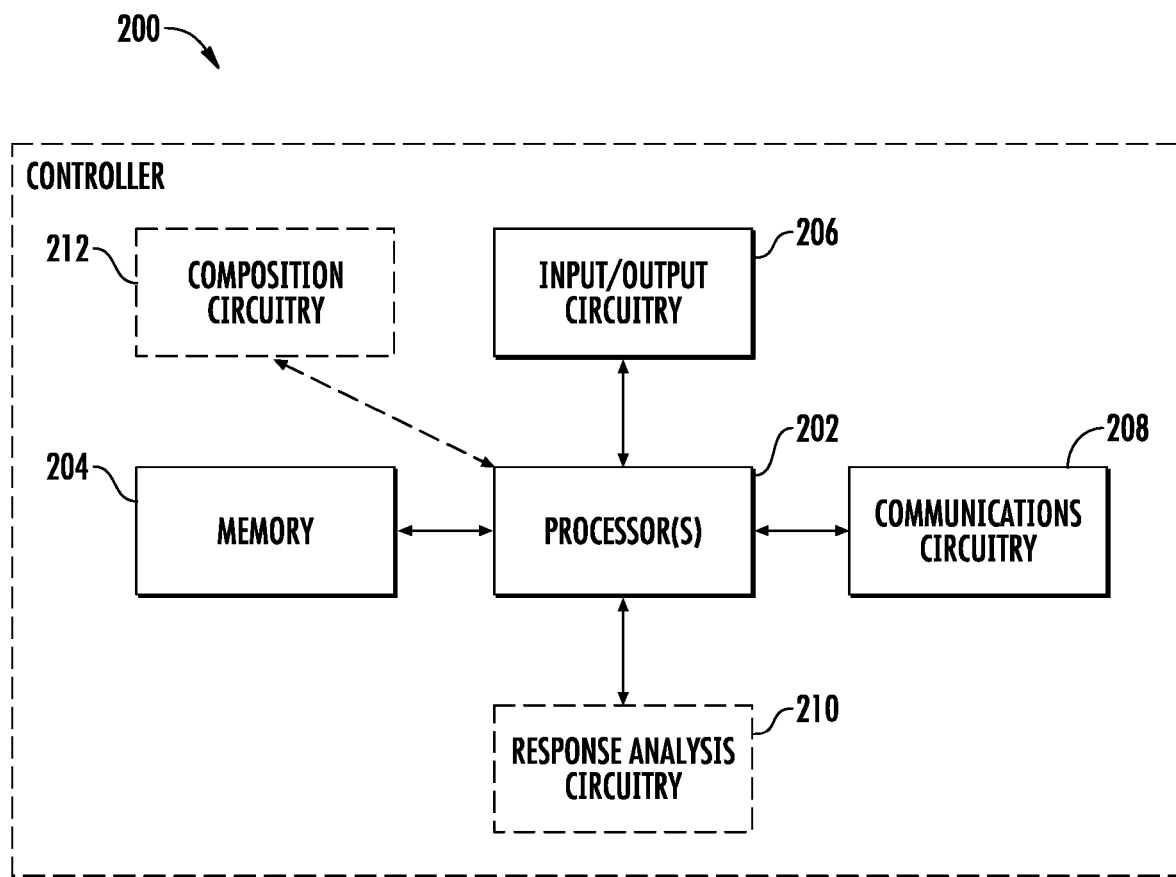
FIG. 6 illustrates a schematic block diagram of example circuitry that may perform various operations, in accordance with some example embodiments described herein.

As illustrated in FIG. 6, the controller 200 may include a processor 202, a memory 204, input/output circuitry 206, and communications circuitry 208. Moreover, the controller 200 may include response analysis circuitry 210 and/or composition circuitry 212. The controller 200 may be configured to execute the operations described below in connection with FIGS. 7-9. Although components 202-212 are described in some cases using functional language, it should be understood that the particular implementations necessarily include the use of particular hardware. It should also be understood that certain of these components 202-212 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the controller 200 may be housed within the sensor device 100. It will be understood in this regard that some of the components described in connection with the controller 200 may be housed within one or more of the device of FIGS. 1 and 4, while other components are housed within another of these devices, or by yet another device not expressly illustrated in FIGS. 1 and 4.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the controller 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the controller 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the controller 200 to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the computing device, and/or remote or "cloud" processors.

In an example embodiment, the processor 202 may be configured to execute instructions stored in the memory 204 or otherwise accessible to the processor 202. Alternatively or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

The controller 200 further includes input/output circuitry 206 that may, in turn, be in communication with processor 202 to provide output to a user and to receive input from a user, user device, or another source. In this regard, the input/output circuitry 206 may comprise a display that may be manipulated by a mobile application. In some embodiments, the input/output circuitry 206 may also include additional functionality including a keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the controller 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the controller 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

Response analysis circuitry 210 includes hardware components designed to determine a first transient and second transient response of the fluid flow system to a first force pulse and second force pulse, respectively, emitted by the force pulse generator. Response analysis circuitry 210 may utilize processing circuitry, such as the processor 202, to perform its corresponding operations, and may utilize memory 204 to store collected information. In some instances, the response analysis circuitry 210 may be configured to determine a difference between the first transient response and the second transient response, compare the difference with one or more air presence thresholds, and determine the presence of the air bubble within the fluid flow system.

Composition circuitry 210 includes hardware components designed to compare the fluid flow system's transient response to the force pulse with one or more fluid composition thresholds. In some instances, the composition circuitry 210 may be configured to determine the composition of the fluid within the fluid flow system as a defined composition in an instance in which the transient response satisfies a fluid composition threshold associated with the defined composition. Composition circuitry 210 may utilize processing circuitry, such as the processor 202, to perform its corresponding operations, and may utilize memory 204 to store collected information.

It should also be appreciated that, in some embodiments, the response analysis circuitry 210 and/or composition circuitry 212 may include a separate processor, specially configured field programmable gate array (FPGA), or application specific interface circuit (ASIC) to perform its corresponding functions.

In addition, computer program instructions and/or other type of code may be loaded onto a computer, processor or other programmable circuitry to produce a machine, such that the computer, processor other programmable circuitry that execute the code on the machine create the means for implementing the various functions, including those described in connection with the components of controller 200.

As described above and as will be appreciated based on this disclosure, embodiments of the present invention may be configured as sensors, methods, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Air Bubble Detection and Fluid Composition Determination

Figure 7:
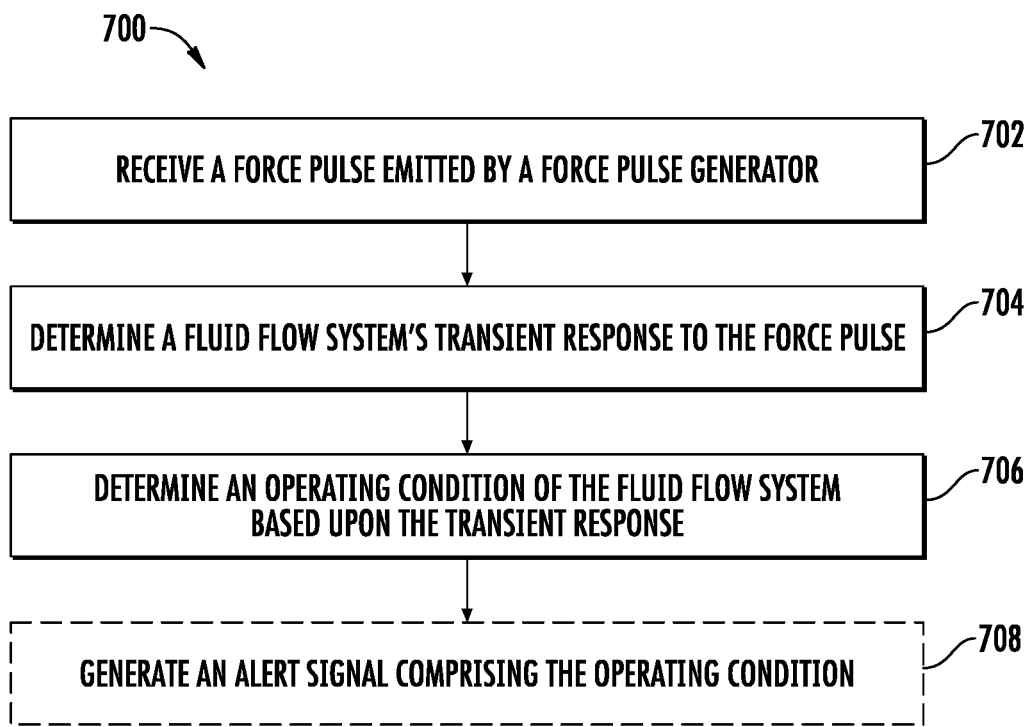
FIG. 7 illustrates an example flowchart for operating condition determinations, in accordance with some example embodiments described herein.

FIG. 7 illustrates a flowchart containing a series of operations for air bubble detection. The operations illustrated in FIG. 7 may, for example, be performed by, with the assistance of, and/or under the control of an apparatus (e.g., sensor device 100 and/or controller 200), as described above. In this regard, performance of the operations may invoke one or more of processor 202, memory 204, input/output circuitry 206, communications circuitry 208, response analysis circuitry 210, and/or composition circuitry 212

As shown in operation 702, the apparatus (e.g., sensor derive 100 and/or controller 200) includes means, such as processor 202, communications circuitry 208, response analysis circuitry 210, or the like, for receiving a force pulse emitted by a force pulse generator 104. As described above, the sensor device 100 may include a force pulse generator 104 coupled with the fluid flow system 102 that is configured to emit a force pulse of a determined amplitude and duration. The generated force pulse emitted by the force pulse generator 104 may propagate as a mechanical force wave though the fluid flow system 102 and be received by an associated force pulse sensor 106 described hereafter. As described above, the force pulse sensor 106 may be coupled with the fluid flow system 102 and configured to receive the force pulse emitted by the force pulse generator 104. For example, the force pulse sensor 106 may be oriented so as to receive a force pulse in a lateral direction of the fluid flow system 102 (e.g., substantially perpendicular with respect to the longitudinal flow direction 101 of the fluid flow system). In instances in which the force pulse sensor 106 comprises the controller 200, the receipt of the force pulse emitted by the force pulse generator 104 by the controller 200 may occur as part of normal operation of the force pulse sensor 106. In instances in which the controller 200 is connected with the force pulse sensor 106, for example over network 104, the force pulse sensor 106 may be configured to iteratively transmit data indicative of the received force pulse to the controller 200.

As shown in operation 704, the apparatus (e.g., sensor derive 100 and/or controller 200) includes means, such as processor 202, response analysis circuitry 210, composition circuitry 212, or the like, for determining the fluid flow system's transient response to the force pulse. As described above with reference to FIGS. 2A-2B, 3A-3B, and 5, the force pulse received by the force pulse sensor 106 may be used to model the transient response as a spring-mass-damping model. As described above, instances in which the fluid flow system 102 includes only fluid increases the spring constant terms in the ODE for modeling transient responses due to the incompressible nature of fluids. Similarly, the introduction of an air bubble 103 in the fluid flow system 102 may operate to reduce this spring constant due to the compressible nature of air. As such, the controller 200 may, in some embodiments, model the force pulse received at operation 702 as a transient response of the fluid flow system 102 that includes an initial transient response amplitude (e.g., the magnitude of the force detected by the force pulse sensor 106) and the rate of decay (e.g., the time required for the fluid flow system 102 to return to a substantially steady state configuration) or settling time. By way of a particular example, the controller 200 may analyze the transient response for the peak amplitude and decay rate between 90% to 10% of amplitude. Although described herein with reference to a particular portion of the transient response of the fluid flow system 102, the present disclosure contemplates that any portion of the transient response or other metric, parameter, attribute, or the like associated with the transient response may be analyzed by the controller 200.

As shown in operation 706, the apparatus (e.g., sensor derive 100 and/or controller 200) includes means, such as processor 202, communications circuitry 208, response analysis circuitry 210, or the like, for determining an operating condition of the fluid flow system 102 based upon the transient response. As described hereafter with reference to FIG. 8, in some embodiments, the operating condition may be indicative of a presence of an air bubble 103 within the fluid flow system 102. By way of example, the controller 200 may iteratively determine the transient response (e.g., first transient response) associated with a respective force pulse transmitted by the force pulse generator 104. Each subsequent transient response (e.g., a second transient response) may be compared with the first transient response to determine a difference between any subsequent in time transient response determination. The controller 200 may employ various air presence thresholds that define, for example, a maximum amplitude and, for example, a minimum rate of decay associated with a transient response so as to bound a set of amplitude and rate of decay values associated with fluid flow (e.g., an absence of an air bubble 103). The controller 200 may compare the difference between these transient responses (e.g., a difference in amplitude and/or rate of decay) with the air presence thresholds and determine the presence of an air bubble in an instance in which the difference satisfies the air presence thresholds.

Figure 9:
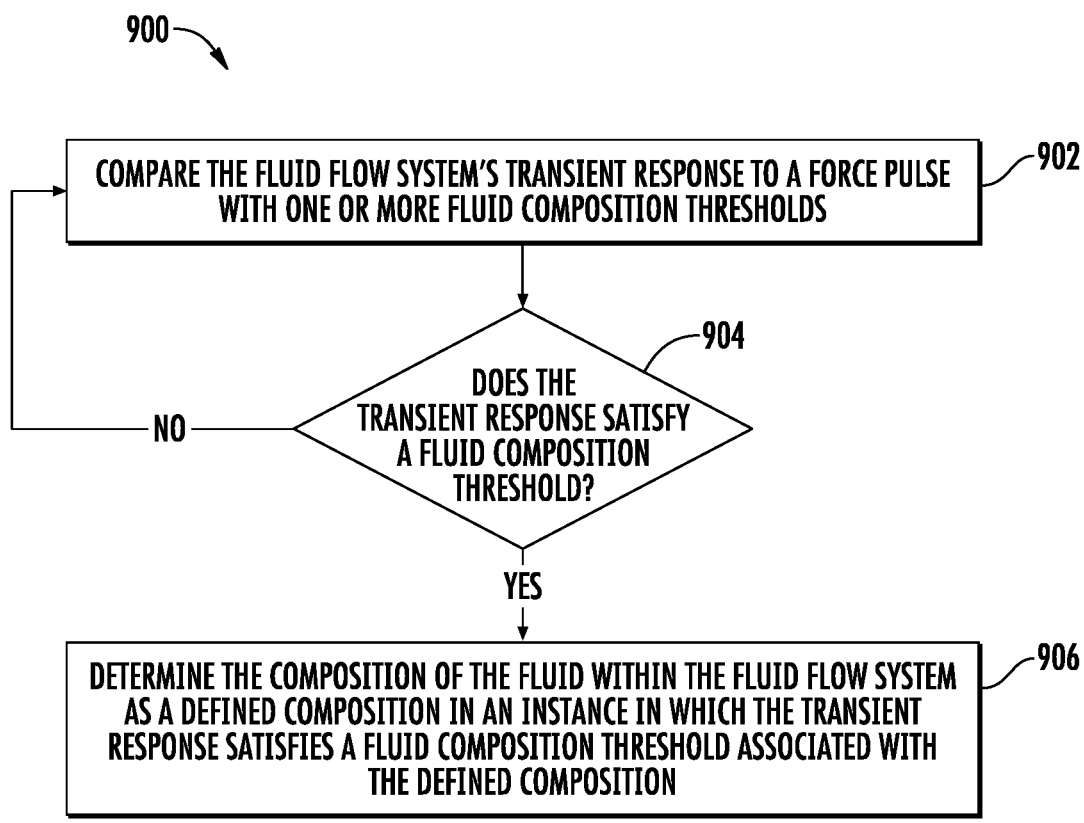
FIG. 9 illustrates an example flowchart for fluid composition determinations, in accordance with some example embodiments described herein.

As described hereafter with reference to FIG. 9, in some embodiments, the operating condition may be indicative of a composition of the fluid within the fluid flow system 102. By way of example, the controller 200 may iteratively determine the transient response (e.g., first transient response) associated with a respective force pulse transmitted by the force pulse generator. Each transient response may be compared with one or more fluid composition thresholds associated with calibrated transient responses of known fluid compositions. By way of example, the fluid flow system 102 may be supplied with non-homogenous fluids each having a known (e.g., determined or otherwise set by the controller 200) composition. The force pulse generator 104 may emit a force pulse through such a non-homogenous fluid and the force pulse sensor 106 may receive said force pulse and generate a transient response for the respective fluid composition. As such, the controller may compare the transient response of the force pulse sensor 106 with one or more composition thresholds associated with known or otherwise calibrated transient responses to identify, for example, a transient response that substantially matches the transient response determined by the controller 200.

In some embodiments, as shown in operation 708, the apparatus (e.g., sensor derive 100 and/or controller 200) includes means, such as processor 202, communications circuitry 208, response analysis circuitry 210, or the like, for generating an alert signal comprising the operating condition. By way of example, the controller 200 may be communicably coupled, over network 104, with a user device associated with a user or operator. In an instance in which the operating condition is indicative of the presence of an air bubble 103 in the fluid flow system 102, the alert signal generated at operation 708 may display a warning to the operator of the fluid flow system 102 or, in some instances, halt operation of the fluid flow system 102. In an instance in which the operating condition is indicative of a fluid composition of the fluid flow system 102, the alert signal generated at operation 708 may cause the fluid composition (e.g., one or more attributes, parameters, etc. of the fluid within the fluid flow system 102) to be displayed to a user. Although described herein with reference to an alert signal, the present disclosure contemplates that the controller 200 may output any indication or cause any action responsive to the determination of an operating condition described herein.

Figure 8:
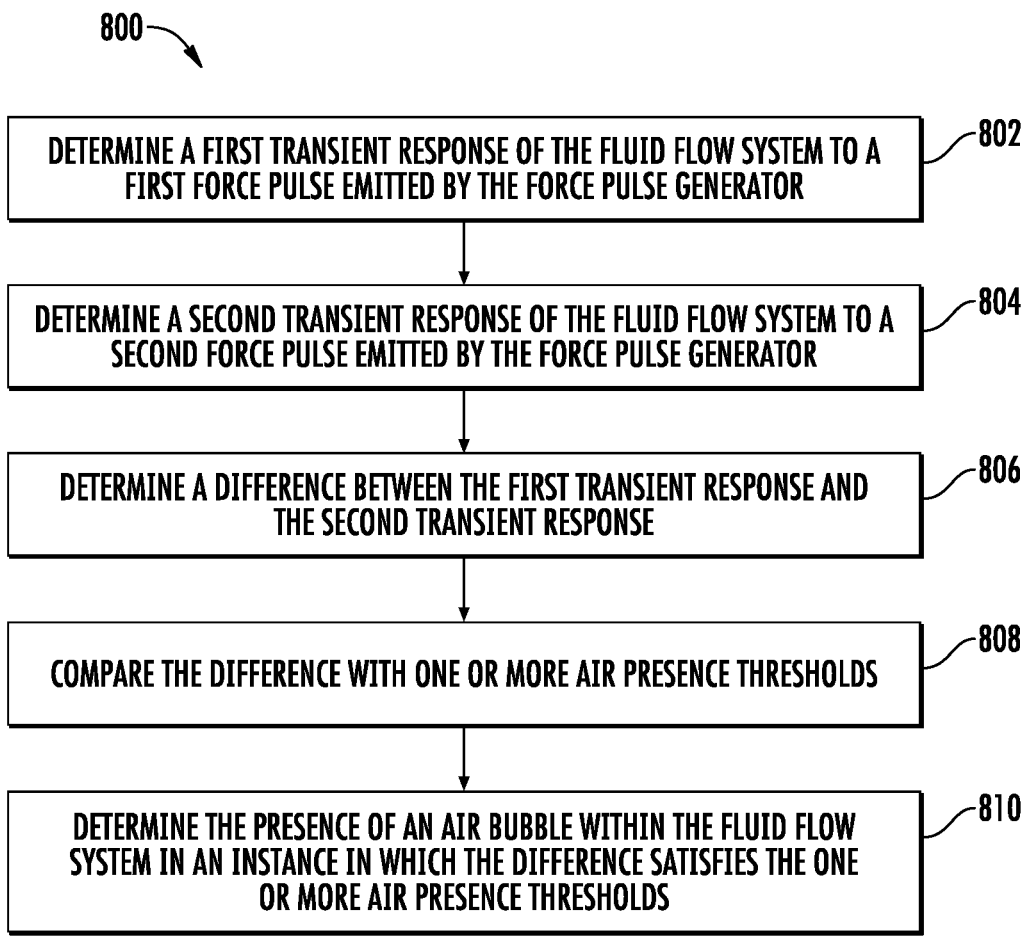
FIG. 8 illustrates an example flowchart for air bubble detection, in accordance with some example embodiments described herein.

FIG. 8 illustrates a flowchart containing a series of operations for air bubble determinations. The operations illustrated in FIG. 8 may, for example, be performed by, with the assistance of, and/or under the control of an apparatus (e.g., sensor device 100 and/or controller 200), as described above. In this regard, performance of the operations may invoke one or more of processor 202, memory 204, input/output circuitry 206, communications circuitry 208, response analysis circuitry 210, and/or composition circuitry 212.

As shown in operation 802, the apparatus (e.g., sensor derive 100 and/or controller 200) includes means, such as processor 202, communications circuitry 208, response analysis circuitry 210, or the like, for determining a first transient response of the fluid flow system 102 to a first force pulse 108 emitted by the force pulse generator 104. As described above, the force pulse generator 104 may iteratively generate and emit a force pulse through the fluid flow system 102. For example, at a first time the force pulse generator 104 may generate a first force pulse 108 that is received by the force pulse sensor 106 and used to determine a first transient response of the fluid flow system 102. As described above and illustrated in FIG. 3A, the first transient response may, in some instances, refer to the transient response of the fluid flow system 102 in an instance in which only fluid is located within the fluid conduit proximate the sensor device 100. The first transient response may be, as described above, associated with, for example, a first amplitude and a first rate of decay.

As shown in operation 804, the apparatus (e.g., sensor derive 100 and/or controller 200) includes means, such as processor 202, communications circuitry 208, response analysis circuitry 210, or the like, for determining a second transient response of the fluid flow system 102 to a second force pulse 112 emitted by the force pulse generator 104. As described above, the force pulse generator 104 may iteratively generate and emit a force pulse through the fluid flow system 102. For example, at a second time that is later in time than the first time, the force pulse generator 104 may generate a second force pulse 112 that is received by the force pulse sensor 106 and used to determine a second transient response of the fluid flow system. As described above and illustrated in FIG. 3B, the second transient response may, in some instances, refer to the transient response of the fluid flow system 102 in an instance in which an air bubble 103 is located within the fluid conduit proximate the sensor device 100. The second transient response may be, as described above, associated with, for example, a second amplitude and a second rate of decay.

As shown in operation 806, the apparatus (e.g., sensor derive 100 and/or controller 200) includes means, such as processor 202, response analysis circuitry 210, or the like, for determining a difference between the first transient response and the second transient response. In some embodiments, the difference determination at operation 806 may refer to a mathematical difference between the first amplitude and the second amplitude, between the first rate of decay and the second rate of decay, and/or between any other metric, parameter, or attribute associated with the respective transient responses. Said differently, the first transient response may refer to instances in which the controller 200 has determined that an air bubble 103 is not present within the fluid flow system proximate the sensor device 100. As such, an instance in which a subsequent in time transient response (e.g., a second transient response) deviates from the first transient response, such as by having an increased amplitude and decreased rate of decay, may indicate the presence of an air bubble 103 in the fluid flow system 102. Although described herein with reference to an example difference that refers to the mathematical difference between amplitude and/or rate of decay values, the present disclosure contemplates that the difference may also refer to any detectable difference between transient responses.

As shown in operation 808, the apparatus (e.g., sensor derive 100 and/or controller 200) includes means, such as processor 202, response analysis circuitry 210, or the like, for comparing the difference with one or more air presence thresholds. As described above, the controller 200 may employ various air presence thresholds that define, for example, a maximum amplitude and, for example, a minimum rate of decay associated with a transient response so as to bound a set of amplitude and rate of decay values associated with fluid flow (e.g., an absence of an air bubble). The controller 200 may compare the difference between these transient responses (e.g., a difference in amplitude and/or rate of decay) to determine if the difference satisfies one or more air presence thresholds. By way of a particular example, the air presence threshold may define a maximum numeric amplitude value that, if exceeded, satisfies the associated air presence threshold. In some embodiments, the air presence threshold may instead define a maximum increase in amplitude of the second amplitude relative the first amplitude. Said differently, the air presence threshold may operate to determine a substantial increase in initial transient amplitude as indicative of the presence of an air bubble 103. In other embodiments, the air presence thresholds may define a minimum numeric rate of decay value that, if not exceeded, satisfies the associated air presence threshold.

As shown in operation 810, the apparatus (e.g., sensor derive 100 and/or controller 200) includes means, such as processor 202, communications circuitry 208, response analysis circuitry 210, or the like, for determining the presence of the air bubble within the fluid flow system 102 in an instance in which the difference satisfies the one or more air presence thresholds. As described above, the incompressible nature of fluids results in an transient response that, relative to air, includes a smaller initial transient amplitude value and a larger rate of decay. As such, in an instance in which the determine difference between the first transient response and the second transient response (e.g., mathematical difference between amplitude, rate of decay, and/or the like) satisfies one or more air presence thresholds, the controller 200 may determine that the operating condition is indicative of the presence of an air bubble within the fluid flow system 102. Although described herein with reference to the presence of an air bubble 103, the present disclosure contemplates that the controller 200 and/or sensor device 100 may be similarly configured for detecting the absence of fluid.

FIG. 9 illustrates a flowchart containing a series of operations for fluid composition determinations. The operations illustrated in FIG. 9 may, for example, be performed by, with the assistance of, and/or under the control of an apparatus (e.g., sensor device 100 and/or controller 200), as described above. In this regard, performance of the operations may invoke one or more of processor 202, memory 204, input/output circuitry 206, communications circuitry 208, and/or response analysis circuitry 210.

As shown in operations 902 and 904, the apparatus (e.g., sensor derive 100 and/or controller 200) includes means, such as processor 202, communications circuitry 208, composition circuitry 212, or the like, for comparing the fluid flow system's transient response to the force pulse with one or more fluid composition thresholds. As described above, the force pulse generator 104 may iteratively generate and emit a force pulse through the fluid flow system 102 that may be received by the force pulse sensor 106 and used to determine a transient response of the fluid flow system 102. The transient response (e.g., each iteratively determined transient response) may be compared with one or more fluid composition thresholds associated with calibrated transient responses of known fluid compositions. By way of example, the fluid flow system 102 may be supplied with non-homogenous fluids each having a known (e.g., determined or otherwise set by the controller 200) composition (e.g., density, mixing ratio, etc.). The force pulse generator 104 may emit a force pulse through such a non-homogenous fluid, and the force pulse sensor 106 may receive said force pulse and generate a transient response for the respective fluid composition. In this way, the controller 200 may determine and store, in memory 204 or otherwise, transient responses for each fluid composition as shown in FIG. 5.

By way of a particular example, a milk processing facility may supply a fluid flow system 102 with milk having various compositions (e.g., skim milk, 2% milk, cream, etc.) As part of a calibration procedure, each composition of milk and various combinations of said compositions may be supplied to the fluid flow system 102 and the sensor device 100 may determine transient responses for each composition. In some embodiments, the controller 200 may employ various modeling or regression techniques in order to project the transient responses for fluid compositions that are not supplied to the fluid flow system 102 but include, at least in part, one or more fluid compositions that were supplied to the fluid flow system 102. As such, the controller may compare the transient response of the force pulse sensor 106 at operation 902 and 904 with one or more composition thresholds associated with known or otherwise calibrated transient responses to identify, for example, a transient response that substantially matches the transient response determined by the controller 200. By way of a particular example, the amplitude and/or rate of decay of the present transient response may be compared with amplitudes and rates of decay for a plurality of prior fluid composition determinations.

Thereafter, as shown in operation 906, the apparatus (e.g., sensor derive 100 and/or controller 200) includes means, such as processor 202, composition circuitry 212, or the like, for determining the composition of the fluid within the fluid flow system as a defined composition in an instance in which the transient response satisfies a fluid composition threshold associated with the defined composition. As described above, the controller 200 may compare the present transient response (e.g., the amplitude, the rate of decay, or the like) with various previously-determined transient responses for known fluid compositions as shown in FIG. 5. In an instance in which the amplitude, the rate of decay, and/or the like substantially matches the transient response (e.g., the amplitude, the rate of decay, and/or the like) of a fluid composition threshold associated with a defined composition, the controller may determine that the fluid within the fluid flow system 102 comprises the defined fluid composition.

FIGS. 7-9 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the controller 200 and executed by a processor 202 of the controller 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

What is claimed is:

1. A sensor device for use with fluid flow systems, the sensor device comprising:
   a force pulse generator coupled with a fluid flow system and configured to emit a force pulse;
   a force pulse sensor coupled with the fluid flow system,
   wherein the force pulse generator is coupled to an exterior surface of a fluid flow conduit of the fluid flow system, and the force pulse sensor is coupled to an interior surface of the fluid flow conduit of the fluid flow system, and
   wherein the force pulse sensor is configured to:
      receive the force pulse emitted by the force pulse generator;
      determine the fluid flow system's transient response to the force pulse; and
      determine an operating condition of the fluid flow system based upon the transient response.

2. The sensor device according to claim 1, wherein the force pulse sensor is further configured to generate an alert signal comprising the operating condition.

3. The sensor device according to claim 1, wherein the force pulse sensor is further configured to determine an amplitude and rate of decay of the transient response.

4. The sensor device according to claim 1, wherein the force pulse generator is spaced apart from the force pulse sensor to collectively define a gap configured to receive the fluid flow conduit of the fluid flow system therebetween.

5. The sensor device according to claim 4, wherein the operating condition determined by the force pulse sensor is indicative of a presence of an air bubble within the fluid flow system.

6. The sensor device according to claim 5, wherein the force pulse sensor, in determining the operating condition of the fluid flow system indicative of the presence of the air bubble within the fluid flow system, is configured to:
   determine a first transient response of the fluid flow system to a first force pulse emitted by the force pulse generator;
   determine a second transient response of the fluid flow system to a second force pulse emitted by the force pulse generator;
   determine a difference between the first transient response and the second transient response;
   compare the difference with one or more air presence thresholds; and
   determine the presence of the air bubble within the fluid flow system in an instance in which the difference satisfies the one or more air presence thresholds.

7. The sensor device according to claim 1, wherein the operating condition determined by the force pulse sensor is indicative of a composition of a fluid within the fluid flow system.

8. The sensor device according to claim 7, wherein the force pulse sensor, in determining the operating condition of the fluid flow system indicative of the composition of the fluid within the fluid flow system, is configured to:
   compare the fluid flow system's transient response to the force pulse with one or more fluid composition thresholds; and
   determine the composition of the fluid within the fluid flow system as a defined composition in an instance in which the transient response satisfies a fluid composition threshold associated with the defined composition.

9. A method comprising:
   receiving, by a force pulse sensor coupled with a fluid flow system, a force pulse emitted by a force pulse generator coupled with the fluid flow system, wherein the force pulse generator is coupled to an exterior surface of a fluid flow conduit of the fluid flow system, and the force pulse sensor is coupled to an interior surface of the fluid flow conduit of the fluid flow system;
   determining, by the force pulse sensor, the fluid flow system's transient response to the force pulse; and
   determining, by the force pulse sensor, an operating condition of the fluid flow system based upon the transient response.

10. The method according to claim 9, further comprising generating, by the force pulse sensor, an alert signal comprising the operating condition.

11. The method according to claim 9, wherein determining the transient response further comprises determining an amplitude and rate of decay of the transient response.

12. The method according to claim 9, wherein the force pulse generator is spaced apart from the force pulse sensor to collectively define a gap configured to receive the fluid flow conduit of the fluid flow system therebetween.

13. The method according to claim 12, wherein the operating condition is indicative of a presence of an air bubble within the fluid flow system.

14. The method according to claim 13, wherein determining the operating condition of the fluid flow system indicative of the presence of the air bubble within the fluid flow system further comprises:
   determining, by the force pulse sensor, a first transient response of the fluid flow system to a first force pulse emitted by the force pulse generator;
   determining, by the force pulse sensor, a second transient response of the fluid flow system to a second force pulse emitted by the force pulse generator;
   determining, by the force pulse sensor, a difference between the first transient response and the second transient response;
   comparing, by the force pulse sensor, the difference with one or more air presence thresholds; and
   determining, by the force pulse sensor, the presence of the air bubble within the fluid flow system in an instance in which the difference satisfies the one or more air presence thresholds.

15. The method according to claim 9, wherein the operating condition determined is indicative of a composition of a fluid within the fluid flow system.

16. The method according to claim 15, wherein determining the operating condition of the fluid flow system indicative of the composition of the fluid within the fluid flow system further comprises:
- comparing, by the force pulse sensor, the fluid flow system's transient response to the force pulse with one or more fluid composition thresholds; and
- determining, by the force pulse sensor, the composition of the fluid within the fluid flow system as a defined composition in an instance in which the transient response satisfies a fluid composition threshold associated with the defined composition.

17. A non-transitory computer-readable storage medium for using an apparatus, the non-transitory computer-readable storage medium storing instructions that, when executed, cause the apparatus to:
- receive, by a force pulse sensor coupled with a fluid flow system, a force pulse emitted by a force pulse generator coupled with the fluid flow system, wherein force pulse generator is coupled to an exterior surface of a fluid flow conduit of the fluid flow system, and the force pulse sensor is coupled to an interior surface of the fluid flow conduit of the fluid flow system;
- determine the fluid flow system's transient response to the force pulse;
- determine an operating condition of the fluid flow system based upon the transient response; and
- generate an alert signal comprising the operating condition.

18. The non-transitory computer-readable storage medium according to claim 17, wherein the non-transitory computer-readable storage medium stores instructions that, when executed, cause the apparatus to:
- determine a first transient response of the fluid flow system to a first force pulse emitted by the force pulse generator;
- determine a second transient response of the fluid flow system to a second force pulse emitted by the force pulse generator;
- determine a difference between the first transient response and the second transient response;
- compare the difference with one or more air presence thresholds; and
- determine a presence of an air bubble within the fluid flow system as the operating condition in an instance in which the difference satisfies the one or more air presence thresholds.

* * * * *